United States Patent [19]
Wasser

[11] Patent Number: 5,636,875
[45] Date of Patent: Jun. 10, 1997

[54] TWO-PART TUBULAR CONNECTOR MADE OF POLYMERS AS WELL AS CONDUIT SYSTEM INCORPORATING SUCH CONNECTOR AND PIPES MADE OF THE SAME POLYMERS

[75] Inventor: Beat Wasser, Flims-Dorf, Switzerland

[73] Assignee: Ems-Inventa AG, Zurich, Switzerland

[21] Appl. No.: 274,269

[22] Filed: Jul. 13, 1994

[30] Foreign Application Priority Data

Jul. 16, 1993 [DE] Germany .......................... 931 0685 U

[51] Int. Cl.$^6$ ...................................................... F16L 47/02
[52] U.S. Cl. ..................... 285/21.1; 385/292; 385/331; 385/332; 385/423; 156/73.5
[58] Field of Search ........................... 285/369, 423, 285/919, 331, 332, 286, 288, 292, 921, 21, 319; 156/73.5, 294; 228/112.1

[56] References Cited

U.S. PATENT DOCUMENTS

| | | | |
|---|---|---|---|
| 3,493,251 | 2/1970 | Kramer | 285/331 X |
| 3,562,078 | 2/1971 | Zumstein | 156/73.5 |
| 3,919,386 | 11/1975 | Segal | 264/255 |
| 4,013,309 | 3/1977 | Quick | 285/332 X |
| 4,043,574 | 8/1977 | Asano | 285/915 |
| 4,047,739 | 9/1977 | Aitken | 285/423 X |
| 4,067,534 | 1/1978 | Frey | 285/319 |
| 4,146,254 | 3/1979 | Turner et al. | 285/106 |
| 4,214,779 | 7/1980 | Losell | 285/319 X |
| 4,754,993 | 7/1988 | Kraynick | 255/423 X |
| 4,844,512 | 7/1989 | Gahwiler | |
| 5,143,117 | 9/1992 | Klein | 285/915 X |
| 5,267,757 | 12/1993 | Dal Palu | 285/423 |

FOREIGN PATENT DOCUMENTS

| | | | |
|---|---|---|---|
| 2124309 | 9/1972 | France . | |
| 3903551 | 8/1989 | Germany . | |
| 3843995 | 6/1990 | Germany . | |
| 554232 | 9/1974 | Switzerland . | |
| 8286 | of 1894 | United Kingdom | 285/319 |

Primary Examiner—Terry Lee Melius
Assistant Examiner—Heather Shackelford
Attorney, Agent, or Firm—Spencer & Frank

[57] ABSTRACT

A pipe connector for liquid-conducting conduits is made of polymers and comprises a core part and a sleeve part for receiving the core part. The core part and sleeve part are each adapted for spin-welding with a polymer conduit to form a permeation-tight connection of pipe conduits made of the same polymers. The core part and the sleeve part each have a cylindrical connection region for spin-welding which includes a cross-sectional narrowing and an annular groove.

13 Claims, 2 Drawing Sheets

5,636,875

TWO-PART TUBULAR CONNECTOR MADE OF POLYMERS AS WELL AS CONDUIT SYSTEM INCORPORATING SUCH CONNECTOR AND PIPES MADE OF THE SAME POLYMERS

CROSS-REFERENCE TO RELATED APPLICATIONS

This application claims the right of foreign priority with respect to application Serial No. G 9310685.8 filed in Germany on Jul. 16, 1993, the disclosure of which is incorporated herein by reference.

BACKGROUND OF THE INVENTION

The invention relates to a fitting-free, quick-fit pipe connector for use in spin-weld pipe connections.

The invention particularly relates to a two-part pipe connector, comprising a core (male) part and sleeve (female) part made of polymers for pipes that conduct permeating media. The connector is suited for spin welding with polymer pipes, particularly for permeation-tight welding.

The invention further relates to a spin-welded conduit system comprising the above-mentioned pipe connectors and pipes made of the same polymers.

Attention is being devoted worldwide to the permeation of volatile media from solvent-conducting conduit systems out of concern for maintaining clean air. Hence, primarily in Europe and the United States, the emissions limit values of, for example, motor vehicles, are being greatly reduced through new clean air ordinances.

In the selection of conduit systems that conduct fuel or solvents and are essentially composed of polymers, not only their material properties, but also the pipe connections have a significant influence on undesired emissions. Today, for problem-free assembly, such pipe connections are preferably quick-fit and/or snap-fit connectors connected to the pipes by means of suitable formed-on or stamped profiles, preferably with the aid of metallic fastening elements.

The drawbacks of the connection of the connector parts to the pipe in the prior art lie in leakages that are caused over the usable life of the components, primarily by vibration of the components, stiffening of the polymers constituting the connector parts and/or the pipes caused by progressive extraction of the additives, particularly the softeners, damage to the pipes caused by burr formation during the production process, e.g. during injection molding, damage to the barrier layer of the pipes during assembly, other types of assembly errors.

SUMMARY OF THE INVENTION

The object of the invention is to overcome the above-noted drawbacks of the prior art and make available a permeation-tight conduit system comprising the connector parts and pipe.

The above and other objects are accomplished according to the invention by the provision of a pipe connector for liquid-conducting conduits, wherein the pipe connector is made of polymers and comprises a core part and a sleeve part for receiving the core part, the core part and sleeve part each being adapted for spin-welding with a polymer pipe to form a permeation-tight connection of pipe conduits made of the same polymers as to the connector parts, and further wherein: the core part and the sleeve part each have a cylindrical connection region which includes a cross-sectional narrowing and an annular groove for being spin-welded to the polymer pipe.

Thus, the object of the invention is attained in particular, by the provision of a rotary connector that can be used in spin-welding, in which both the core (male) and sleeve (female) part are suited for spin-welding by virtue of a specially-shaped connection region where a polymer pipe is spin-welded to the respective connector part.

During spin-welding of the components, the connector part is preferably attached to a securely clamped pipe at a high velocity. During the course of assembly of the components, which are matched in dimensions, the polymer material of the connector part of the pipe is caused to melt due to frictional heat, causing complete sealing of the connector part to the pipe by the subsequent solidification.

DETAILED DESCRIPTION OF THE PREFERRED EMBODIMENT

Figure 1:
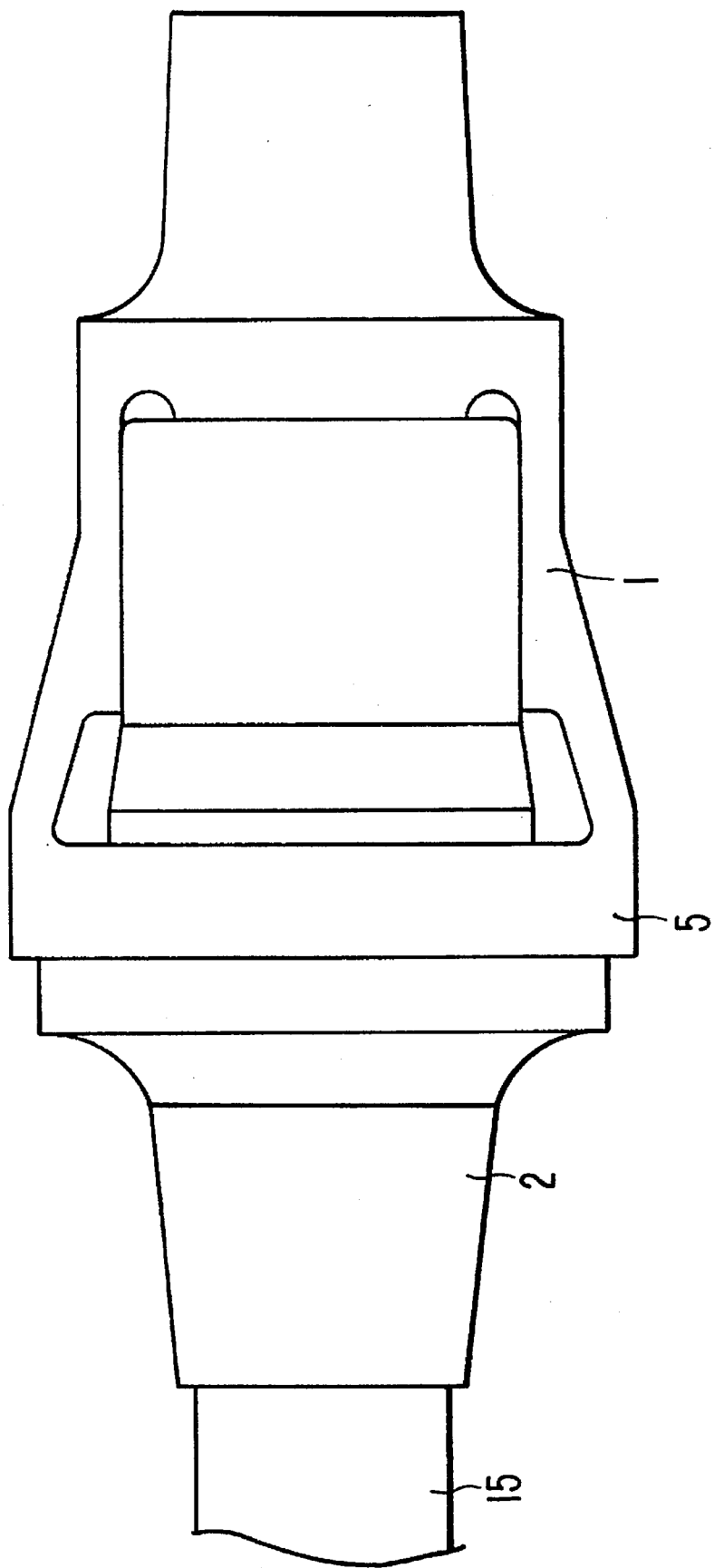
FIG. 1 is a longitudinal view showing an example of a quick-fit connector for spin-welding according to the invention.
Figure 2:
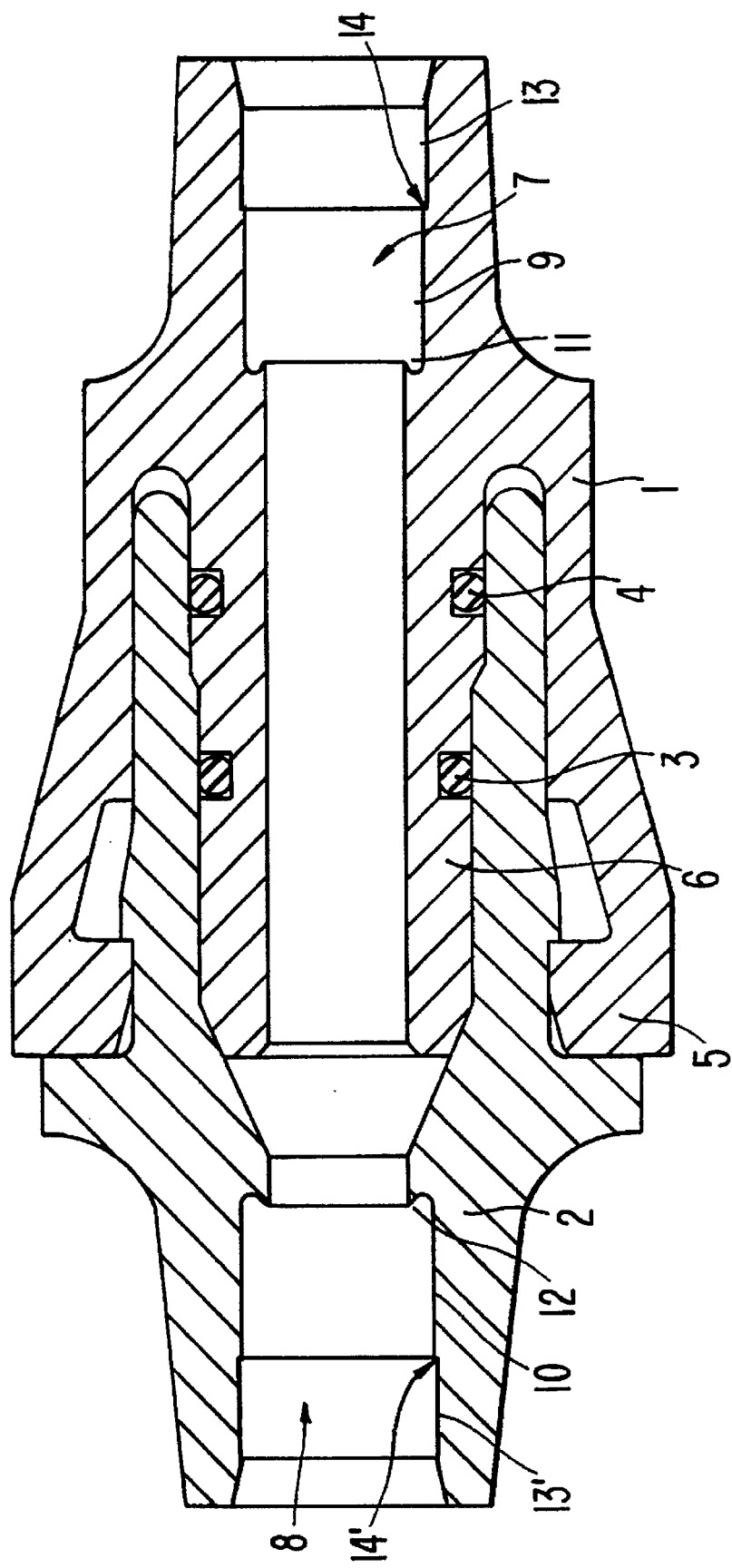
FIG. 2 is a sectional view of the connector shown in FIG. 1.

Referring to FIGS. 1 and 2, there is shown a quick-fit and quick-release connector for a pipe 15 or conduit according to the invention which includes a core or male connector part 1 and a sleeve or female connector part 2. Core part 1 has snap hooks 5 and two sealing elements 3, 4 on a connecting piece 6, analogous to the device disclosed in Swiss Application 2603/87. Core part 1 has a cylindrical connection region 7, which includes a first cylindrical region 13 having a diameter greater than the pipe 15, and a second cylindrical region 9 which has a diameter narrower than the first cylindrical region 13. The first cylindrical region 13 acts as a guide for the pipe 15, and the second cylindrical region 9 frictionally engages the pipe to generate the necessary frictional heat during the spin welding. The two regions 13, 9 are separated by step 14. Likewise, sleeve part 2 has cylindrical regions 10, 13' separated by step 14' in a cylindrical connection region 8 for the purpose of additional material for frictional melting of the polymers comprising the connector parts. The cylindrical connection regions further include an annular groove 11, 12 for receiving melted polymer material or material from the resulting melt.

The polymers of the pipe connector parts of the invention advantageously contain conductive additives, preferably conductive carbon black, that sensibly correspond to the additives of the pipes to be spin-welded on. The polymers of the connector parts also advantageously contain reinforcing fillers such as glass, carbon, polymer of mineral fibers and whisker.

The polymers of the connector parts of the invention are preferably polyamides such as homopolyamides, copolyamides or blends thereof with thermoplastic polymers. Preferred polyamides are PA6, PA66, PA11 and PA12, also known as nylon 6, nylon 66, nylon 11 and nylon 12.

Conduit systems comprising the pipe connector of the invention and pipes to be connected to the respective connector parts are preferably made of the same polymer material in order to achieve optimum bonding and imperviousness to permeation of the spin-welded parts to permeation. The polymers of the components can contain the same additives, for example conductive carbon black. It can be advantageous when, for example, fillers, especially reinforcing fibers, are only contained in the polymer of the connector parts, for example when the pipes are not intended to be additionally reinforced.

Conduit systems in accordance with the invention, comprising a pipe connector and pipes made of the same polymer, particularly of polyamides, are recyclable, and thus advantageously fulfill today's requirements with regard to environmentally-friendly options.

The invention further includes the method of manufacturing such conduit systems of the invention by means of spin-welding, and the conduit systems manufactured in accordance with this method.

The invention now being fully described, it will be apparent to one of ordinary skill in the art that changes and modifications may be made to the invention without departing from the spirit or scope of the invention as set forth herein.

What is claimed is:

1. A pipe connector for liquid-conducting pipes, the pipe connector being made of polymers and comprising:

a core part having a connector region for receiving therein a first pipe made of the same polymers as the pipe connector, said core part connector region including:

a first cylindrical region having a diameter greater than an outer diameter of the first pipe so as to receive the first pipe therein with a clearance;

a second cylindrical region located adjacent to and axially inwardly of said first cylindrical region as viewed in a direction of introduction of the first pipe into the pipe connector; said second cylindrical region having a diameter less than the diameter of the first cylindrical region for receiving the first pipe in a frictional engagement; and an annular groove arranged adjacent to said second cylindrical region for receiving melted polymers from a resulting melt when said core part is spin-welded to the first pipe to form a permeation-tight connection therebetween; and a sleeve part having a connector region for receiving therein a second pipe made of the same polymers as the pipe connector, said sleeve part connector region including:

a first sleeve part cylindrical region having a diameter greater than an outer diameter of the second pipe so as to receive the second pipe therein with a clearance;

a second sleeve part cylindrical region located adjacent to and axially inwardly of said first sleeve part cylindrical region as viewed in a direction of introduction of the second pipe into the pipe connector; said second sleeve part cylindrical region having a diameter less than the diameter of said first sleeve part cylindrical region for receiving the second pipe in a frictional engagement; and an annular groove arranged adjacent to said second sleeve part cylindrical region for receiving melted polymers from a resulting melt when said sleeve part is spin-welded to the second pipe to form a permeation-tight connection therebetween;

said sleeve part being adapted to receive said core part therein in a quick-connect and a quick-release permeation-tight connection.

2. A connector as defined in claim 1, wherein the polymers of the connector parts are selected from the group including homopolyamides, copolyamides and polyamide blends with thermoplastic polymers.

3. A connector as defined in claim 2, wherein the polyamides are selected from the group including PA6, PA66, PA11 and PA12.

4. A connector as defined in claim 1, wherein the polymers of the connector parts contain conductive additives.

5. A connector as defined in claim 4, wherein the conductive additives include conductive carbon black.

6. A connector as defined in claim 1, wherein the polymers of the connector parts contain reinforcing fillers from the group including glass fibers, carbon fibers, polymer reinforcing fibers, whiskers and mineral fibers.

7. A recyclable, spin-welded conduit system comprising:

liquid-conducting first and second polymer pipes; and a pipe connector made of the same polymers as said pipes, and comprising:

a core part having a connector region for receiving therein said first pipe, said core part connector region including:

a first cylindrical region having a diameter greater than an outer diameter of said first pipe so as to receive said first pipe therein with a clearance;

a second cylindrical region located adjacent to and axially inwardly of said first cylindrical region as viewed in a direction of introduction of the first pipe into the pipe connector; said second cylindrical region having a diameter less than the diameter of said first cylindrical region for receiving said first pipe in a frictional engagement; and an annular groove arranged adjacent to said second cylindrical region for receiving melted polymers from a resulting melt when said core part is spin-welded to said first pipe to form a permeation-tight connection therebetween; and a sleeve part having a connector region for receiving therein said second pipe, said sleeve part connector region including:

a first sleeve part cylindrical region having a diameter greater than an outer diameter of said second pipe so as to receive said second pipe therein with a clearance;

a second sleeve part cylindrical region located adjacent to and axially inwardly of said first sleeve part cylindrical region as viewed in a direction of introduction of the second pipe into the pipe connector; said second sleeve part cylindrical region having a diameter less than the diameter of said first sleeve part cylindrical region for receiving said second pipe in a frictional engagement; and an annular groove arranged adjacent to said second sleeve part cylindrical region for receiving melted polymers from a resulting melt when said sleeve part is spin-welded to said second pipe to form a permeation-tight connection therebetween;

said sleeve part being adapted to receive said core part therein in a quick-connect and a quick-release permeation-tight connection.

8. A recyclable, spin-welded conduit system as defined in claim 7, wherein the polymers comprising said pipes include polyamides selected form the group including homopolyamides, copolyamides, and polyamide blends with thermoplastic polymers.

9. A recyclable, spin-welded conduit system as defined in claim 8, wherein the polyamides are selected from the group comprising PA6, PA66, PA11 and PA12.

10. A recyclable, spin-welded conduit system as defined in claim 7, wherein the polymers comprising said connector parts and said pipes contain like additives.

11. A recyclable, spin-welded conduit system as defined in claim 10, wherein the additives include conductive carbon black.

12. A recyclable, spin-welded conduit system as defined in claim 7, wherein only the polymer comprising said connector parts contains reinforcing fillers.

13. A method of producing a permeation-tight connection between first and second polymer pipes, comprising the steps of:

providing a pipe connector made of the same polymers as the pipes, and comprising:

a core part having a connector region for receiving therein the first pipe, the core part connector region including:

a first cylindrical region having a diameter greater than an outer diameter of the first pipe so as to receive the first pipe therein with a clearance;

a second cylindrical region located adjacent to and axially inwardly of the first cylindrical region as viewed in a direction of introduction of the first pipe into the pipe connector; said second cylindrical region having a diameter less than the diameter of the first cylindrical region for receiving the first pipe in a frictional engagement; and an annular groove arranged adjacent to the second cylindrical region for receiving melted polymers from a resulting melt when the core part is spin-welded to the first pipe to form a permeation-tight connection therebetween; and a sleeve part having a connector region for receiving therein the second pipe, the sleeve part connector region including:

a first sleeve part cylindrical region having a diameter greater than an outer diameter of the second pipe so as to receive the second pipe therein with a clearance;

a second sleeve part cylindrical region located adjacent to and axially inwardly of the first sleeve part cylindrical region as viewed in a direction of introduction of the second pipe into the pipe connector; said second sleeve part cylindrical region having a diameter less than the diameter of the first sleeve part cylindrical region for receiving the second pipe in a frictional engagement; and an annular groove arranged adjacent to the second sleeve part cylindrical region for receiving melted polymers from a resulting melt when the sleeve part is spin-welded to the second pipe to form a permeation-tight connection therebetween;

adapting the sleeve part to receive the core part therein in a quick-connect and a quick-release permeation-tight connection; and connecting the core part and the sleeve part to the first and second pipes, respectively, by spin-welding.

\* \* \* \* \*